United States Patent [19]

Ando

[11] Patent Number: 4,797,868
[45] Date of Patent: Jan. 10, 1989

[54] OPTICAL SYSTEM EMPLOYING A LASER BEAM FOR FOCUSING, TRACKING AND TRANSFERRING INFORMATION SIGNALS WITH RESPECT TO A MAGNETO-OPTICAL MEMORY

[75] Inventor: Hideo Ando, Tokyo, Japan

[73] Assignee: Kabushiki Kaisha Toshiba, Kawasaki, Japan

[21] Appl. No.: 862,829

[22] Filed: May 13, 1986

[30] Foreign Application Priority Data

May 15, 1985 [JP] Japan .................................. 60-103323
May 16, 1985 [JP] Japan .................................. 60-104422
May 22, 1985 [JP] Japan .................................. 60-109564

[51] Int. Cl.⁴ ................................................ G11B 7/00
[52] U.S. Cl. .......................................... 369/44; 369/46; 369/13; 369/112; 360/114; 250/201; 365/122
[58] Field of Search ........................... 369/13, 44–46, 369/111, 112, 120–122; 360/114; 365/121, 122; 250/201 DF

[56] References Cited

U.S. PATENT DOCUMENTS

| 4,561,032 | 12/1985 | Matsumoto et al. | ............ 369/13 X |
| 4,638,470 | 1/1987 | Connell et al. | ........................ 369/13 |
| 4,654,529 | 3/1987 | Ando | ................... 250/216 |

FOREIGN PATENT DOCUMENTS

| 2445333 | 4/1975 | Fed. Rep. of Germany . |
| 5482628 | 1/1981 | Japan . |
| 55121646 | 3/1982 | Japan . |
| 57-3934 | 7/1983 | Japan . |
| 59-77649 | 5/1984 | Japan . |
| 59-121639 | 7/1984 | Japan . |
| 59-203259 | 12/1984 | Japan . |
| 58167821 | 4/1985 | Japan . |

OTHER PUBLICATIONS

Magneto-Optical Disk Memory, Imamura, Electronics in Japan, pp. 25-29 (undated).
Digital Magneto-Optical Disk Drive, Deguchi et al., Central Research Laboratories Sharp Corporation, pp. ThC-C1-1 to ThC-C1-4 (Apr. 1984).

Primary Examiner—Robert L. Richardson
Attorney, Agent, or Firm—Finnegan, Henderson, Farabow, Garrett, & Dunner

[57] ABSTRACT

An optical system for use with an optical memory including an optical arrangement for separating light reflected from the surface of the optical memory into a plurality of different resultant beams. This optical mechanism comprising four reflecting surfaces each of which are inclined at a different angle relative the optical memory to direct the resultant beams of light each in a different direction nor normal or parallel to each other. Preferably, at least three of these reflective surface are contiguous to one another. The optical system further includes a photodetector having a plurality of photosensitive regions aligned to receive the resultant beams from the aforementioned reflective surfaces.

19 Claims, 10 Drawing Sheets

OPTICAL SYSTEM EMPLOYING A LASER BEAM FOR FOCUSING, TRACKING AND TRANSFERRING INFORMATION SIGNALS WITH RESPECT TO A MAGNETO-OPTICAL MEMORY

BACKGROUND OF THE INVENTION

The present invention relates to an optical system for use with an optical memory in which information is stored or retrieved by light exposure and, more particularly, to an optical head for applying a focused laser beam onto a magneto-optical disk memory to store or retrieve information from the magneto-optical disk memory utilizing a magnetic Kerr or magnetic Faraday effect.

Magneto-optical disk memories are known which have an amphorous magnetic recording layer or film in which information is stored and from which that information may be read on the basis of the magnetic Kerr or Faraday effect. More specifically, the recording layer effectively comprises a plurality of small magnetics, the orientation of which indicates data bit information. To store such information, a laser beam is focused onto a predetermined memory track of the recording layer of a magneto-optical disk while the disk is exposed to a weak magnetic field of a predetermined direction. The laser beam forms information bits in the recording layer since the small magnet at the point of contact of the laser beam and recording layer will be aligned by the weak field, while outside that point of contact no such alignment occurs.

Information stored in a magneto-optical disk may be read from the disk directly after the information is written into the disk. More specifically, when a laser beam is focused onto the recording layer of a disk in the read mode, light is reflected by that layer. An electromagnetic vector of the resultant reflected light is rotated in correspondence with the direction of magnetization of the layer in accordance with the magnetic Kerr effect. The recorded information can thus be reproduced on the basis of the properties of this light.

Stored information can also be erased from a magneto-optical disk. More specifically, when a laser beam is focused onto the recording layer of the disk while that layer is, exposed to a magnetic field with a polarity opposite to that used in the storing mode, any information bits stored in the recording layer are effectively erased.

As noted above, light from a laser is focused onto the recording layer of a magneto-optical disk and the resultant reflected light is detected by an optical head unit. A typical example of an optical head unit for storing information in or retrieving it from a magneto-optical disk is described by Nobutaka IMAMURA in "Magneto-Optical Disk Memory", *Electronics in Japan* '84-85, pp.25-29.

In the optical head of the IMAMURA article, light reflected from the recording layer of a magneto-optical disk is separated into two light beams by a half mirror. On light beam is guided to a first optical system for focusing and tracking the optical head. The other light beam is guided to a second optical system that includes an analyzer for extracting a P (parallel) component or an S (Senkrecht) component from the light reflected by the magneto-optical disk. The extracted P or S component is guided to an information reading photodetector. In this example, however, the optical head includes a plurality of independent optical systems (i.e., the first and second optical systems), so the optical head configuration is complex. In addition, only one of the P and S components from the reflected light is utilized to read out the information. Therefore, the S/N ratio (Signal-to-Noise ratio) is low.

Another example of a conventional optical head for storing information in or retrieving it from a magneto-optical disk is reported by T. DEGUCHI et al., in "Digital Magneto-Optical Disk Drive", *Proceedinqs of the Conference of Optical Data Storage*, April 1984.

In this conventional optical head, light reflected by a magneto-optical disk is split by a beam splitter into two light beams. One light beam is guided to a first optical system for focusing and tracking the optical head. The other light beam is guided to a second optical system for data information signal read out. The second optical system includes a polarizing beam splitter for splitting the light reflected by the magneto-optical disk into P and S components. The P and S components are detected by respective Si-Avalanche photodiodes. The information signal is then reproduced in accordance with a differential readout method. The S/N ratio is higher than in the former example, but a complex optical head is still required. The increased weight of such an optical head also hinders high-speed access to a desired memory track.

SUMMARY OF THE INVENTION

Accordingly, it is an object of the present invention to provide an improved optical system for an optical memory wherein information may be optically stored and retrieved.

It is another object of the present invention to provide an optical system for an optical memory wherein information can be read out with a high S/N ratio.

It is still another object of the present invention to provide an optical system for an optical memory wherein high-speed information access can be performed.

In accordance with the present invention, there is provided an optical system for use with an optical memory comprising means for directing a light beam onto the optical memory; means for separating resultant light received from the optical memory into a plurality of different resultant light beams, this means for separating comprising a plurality of light reflecting surfaces each inclined at a different angle relative the to optical memory to direct the resultant light beams each in a direction not normal or parallel to each other, those light beams converging upon a single plane; and means for detecting the resultant light beams as those resultant light beams converge upon that single plane.

Preferably, there are at least four light reflecting surfaces, three of which are contiguous to one another and are utilized to separate the resultant light from the optical memory into three resultant light beams for indicating focus and alignment of the means for directing, and one of which is employed for separating the resultant light into two polarized components which indicate the information stored in the optical memory.

In a more limiting sense, the subject invention comprises means for separating light reflected from a tracked surface of an optical memory into first and second polarized "S" and "P" component and for separating one of these first and second components into third, fourth and fifth secondary components, this separating means comprising a first surface for reflecting the first component in a first direction and for transmitting the second component therethrough, and a second surface for reflecting the second component in a second direction, the means for separating further comprising third, fourth and fifth secondary surfaces for separating one of the first and second components into the aforementioned third, fourth and fifth secondary components oriented in third, fourth and fifth directions, respectively, with none of the third, fourth and fifth directions and the direction of the other of the first and second components being parallel or normal to each other and each converging upon at least one of the regions of the photodetector unit; and means coupled to the photodetector unit for sensing data stored in the tracked surface as a function the combined value of the third, fourth and fifth components in comparison to the value of the other of the first and second components and for orienting the means for directing to focus and align the light beam on the tracked surface as a function of the third, fourth and fifth components.

DETAILED DESCRIPTION OF THE PREFERRED EMBODIMENTS

Figure 1:
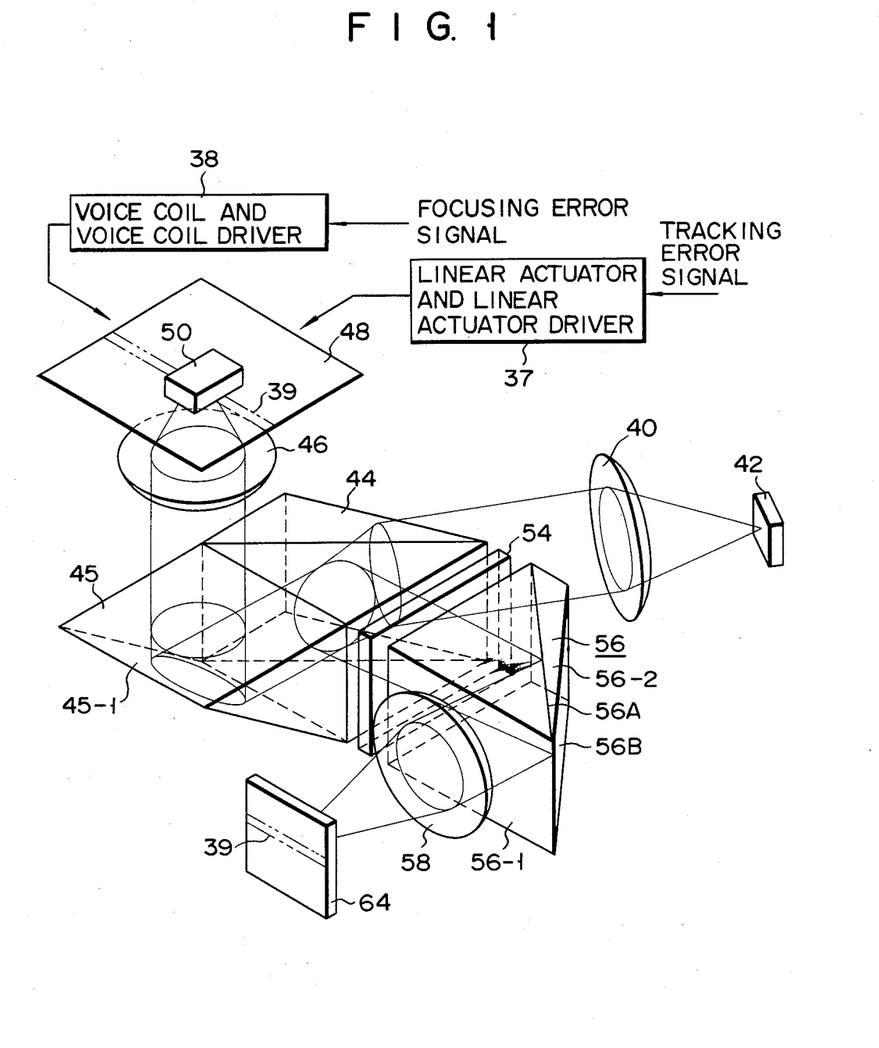
FIG. 1 is a perspective view showing an arrangement of an optical system adopting a knife-edge method according to an embodiment of the present invention, for optically recording, reproducing and erasing information.

FIG. 1 shows an optical system of an erasable optical head adopting a knife-edge method according to an embodiment of the present invention. In this optical system, a laser beam with an elliptic section emitted from semiconductor laser 42 is converted into collimated beams by collimator lens 40, and are incident on beam splitter 44. The laser beams with the elliptic section are obliquely incident on the light incident surface of splitter 44, and converted into beams with a circular section within splitter 44. The laser beams passing through splitter 44 are reflected by reflecting surface 45-1, formed on a surface of prism 45 bonded to splitter 44, guided to objective lens 46, and converged on optical disk 48 by lens 46. Optical disk 48 has, for example, a recording layer made of an amorphous magnetic alloy. Tracking guide 39 is formed concentrically or spirally in a recessed or projecting manner on the surface of disk 48. Preparatory information such as track addresses or sector addresses, i.e., a preform signal, is preformed as recessed or projecting prepits in tracking guide 39. When information is not recorded on the recording layer of optical disk 48, directions of all the magnetic domains of the recording layer are aligned along a predetermined direction. When a magnetic field is applied to quickly heat the recording layer in a storing mode, the directions of magnetization of the magnetic domains in the heated region are reversed. Laser 42 is driven by a drive circuit (not shown). In the reproduction mode, a laser beam with a predetermined light intensity is emitted by laser 42. In the recording mode, a laser beam with a light intensity modulated in accordance with information to be recorded is emitted. In the erasure mode, a laser beam with a predetermined light intensity higher than that in the reproduction mode is emitted.

In the recording mode, a static magnetic field generated by magnetic unit 50 is supplied to optical disk 48. When a recording laser beam traces tracking guide 39 on disk 48, a specific region on disk 48 is heated quickly to reverse the direction of magnetization, thereby recording information. In the reproduction mode, when a reproducing laser beam traces guide 39 on disk 48 so that the reverse-magnetized magnetic domain regions are irradiated with a converged laser beam, the plane of polarization of the laser beam is rotated slightly. In the erasure mode, the static magnetic field generated by unit 50 is supplied to disk 48. When the reverse-magnetized specific region is irradiated with the erasing laser beam, the region is heated slowly, and its direction of magnetization is again revers ed, reverting it to be the same as the other regions. An optical disk of the type wherein information is recorded thereon or erased therefrom using this inversion of magnetization is called a magneto-optical type optical disk.

The laser beam reflected by disk 48 is transmitted through objective lens 46, reflected by reflecting surface 45-1 of prism 45, and introduced into beam splitter 44 to be reflected therein. The reflected laser beam is then transmitted through ½ wave plate 54 to rotate its plane of polarization through substantially 45 degrees and to increase the S component. The laser beam is then introduced to polarizing beam splitter 56 as collimated beams.

Figure 2:
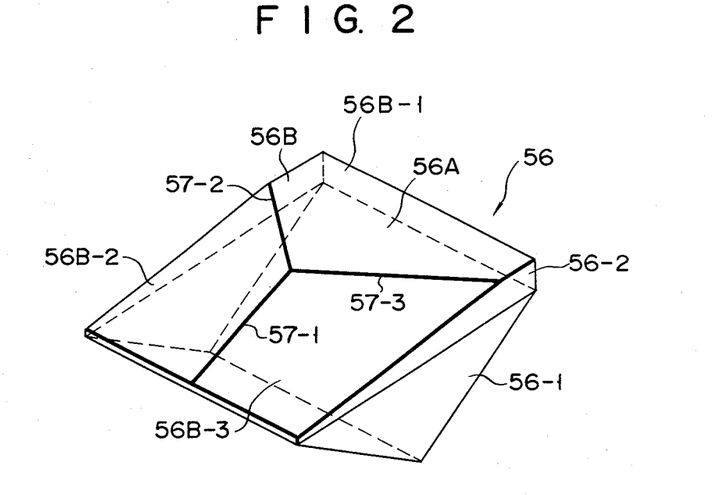
FIG. 2 is a perspective view of the polarizing beam splitter shown in FIG. 1.

Splitter 56 is obtained by bonding wedge prism 56-2 to rectangular prism 56-1, as shown in FIG. 1. The bonding surface constitutes polarizing surface 56A of prism 56-1 and reflecting surface 56B of prism 56-2. Prism 56-2 is formed by cutting its inclined surface as a prospective reflecting surface such that surfaces 56B-2 and 56B-3 are formed to be inclined with respect to surface 56B-1, as shown in FIG. 2. The reflecting surfaces of prism 56-2 are separated by boundary 57-1 contacting surfaces 56B-2 and 56B-3, boundary 57-2 contacting surfaces 56B-1 and 56B-2, and boundary 57-3 contacting surfaces 56B-1 and 56B-3. Surface 56B can be a lightreflecting surface formed by coating, or can be a total reflecting surface. Boundary 57-1 must be substantially parallel to the extending direction of an image of a tracking guide of disk 48 on wedge prism 56-2, or the extending direction of an image of a tracking guide projected onto an optical detector.

Figure 3:
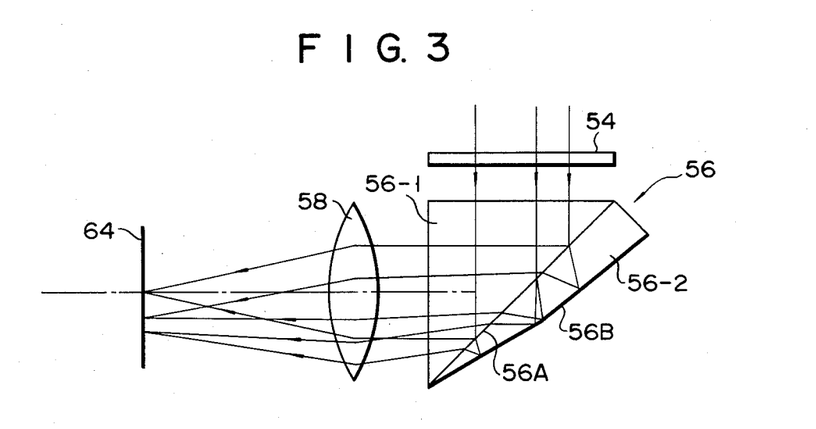
FIG. 3 shows paths of laser beams split by the polarizing beam splitter shown in FIG. 2.

When the collimated laser beams including P and S components are incident on splitter 56, the S component is reflected by surface 56A, and the P component is transmitted through surface 56A to reach surface 56B and to be reflected thereby. Surfaces 56B and 56A are not parallel to each other and constitute a small angle. Laser beams of P and S components are thus directed in different directions. When laser beams of P component are reflected by surface 56B, split laser beams of S component and first, second and third P components are converged by projection lens 58 and incident on optical detector 64. Therefore, when the objective lens is in the in-focus state, the convergence points of the laser beams of S component and the first, second and third P components are formed on different regions of the light-receiving surface of detector 64.

Figure 4:
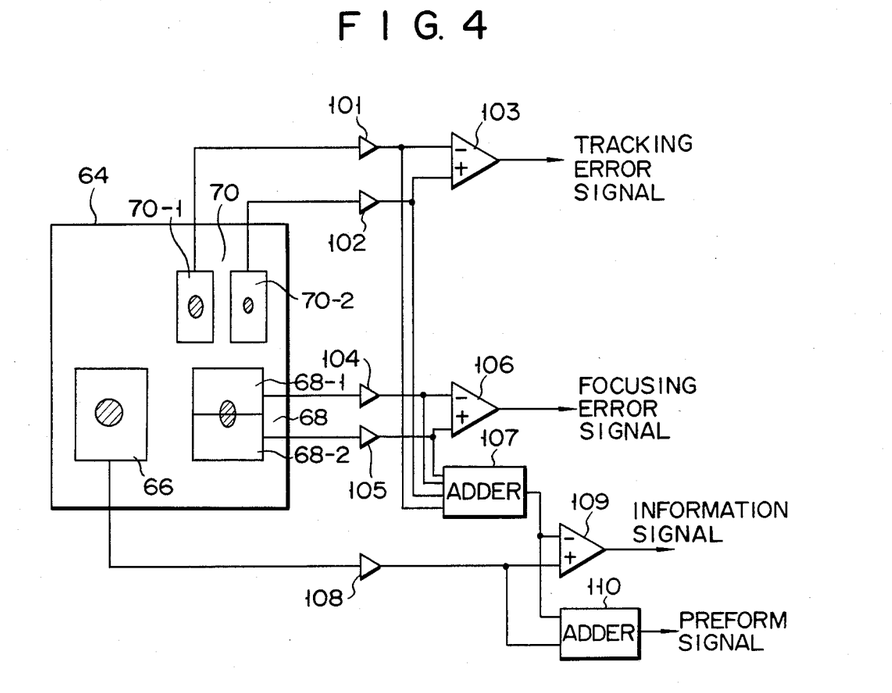
FIG. 4 is a plan view of the optical detector and its peripheral circuits shown in FIG. 1.

As shown in FIG. 4, detector 64 has first, second, and third detecting sections 66, 68 and 70. Section 66 has a detecting region on which the convergence point of a laser beam of the S component is formed when lens 46 is in the in-focus state. Section 68 consists of two detecting regions 68-1 and 68-2, at the midpoint between which the convergence point of a laser beam of the first P component reflected by surface 56B-1 is formed when lens 46 is in the in-focus state. Section 70 consists two detecting sections 70-1 and 70-2, on each of which the point of convergence of the laser beam of the second or third P component reflected by surface 56B-2 or 56B-3 is formed. Detection regions 68-1 and 68-2 of second section 68 are separated along the direction of boundary 57-1, and detection regions 70-1 and 70-2 of third section 70 are separated along a direction perpendicular to the direction of boundary 57-1, with a gap therebetween.

Signals produced by first and second regions 70-1 and 70-2 of third detecting section 70 are amplified by amplifiers 101 and 102, and their difference is obtained by subtracter 103, thereby generating a tracking error signal. Signals from first and second regions 68-1 and 68-2 of second detecting section 68 are amplified by amplifiers 104 and 105, and their difference is obtained by subtracter 106, thereby generating a focusing error signal. The signals from first and second regions 68-1 and 68-2 of second detecting section 68, and from first and second regions 70-1 and 70-2 of third detecting section 70 are also added by adder 107. The difference between the addition output and a signal generated by first detecting section 66 and amplified by amplifier 108 is obtained by subtracter 109, thereby reproducing information. Signals from first detecting section 66, from first and second regions 68-1 and 68-2 of second detecting section 68, and from first and second regions 70-1 and 70-2 of third detecting section 70 are added by adders 110 and 107, thereby reproducing a preform signal. Objective lens 46 is shifted by voice coil driver 38 along its optical axis in response to the focusing error signal so as to be maintained in the in-focus state. Objective lens 46 is also shifted by linear actuator 37 in a direction perpendicular to the optical axis in response to the tracking error signal, so that the tracking guide is traced with a correctly focused laser beam. As a result, recorded information is read from the optical disk 48, and preform signals and recorded information are reproduced. In the same manner, in the recording mode, information is written correctly, and in the erasure mode, recorded information is reliably erased.

Figure 5:
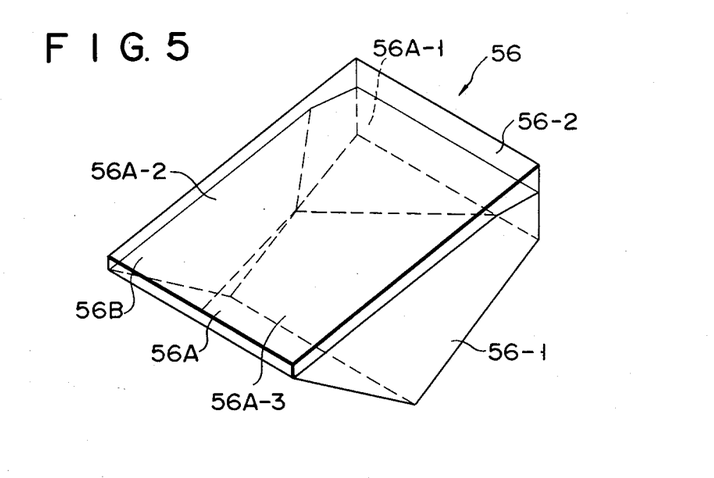
FIG. 5 is a perspective view of a polarizing beam splitter according to a modification of the present invention.
Figure 6A:
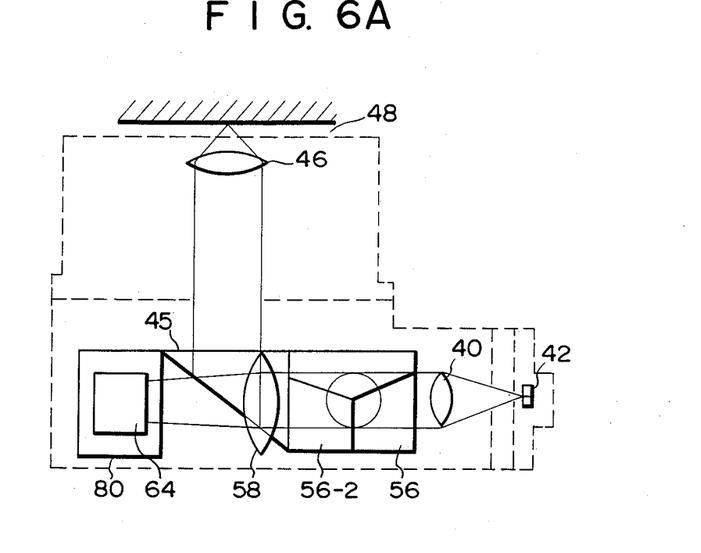
FIGS. 6A and 6B are side and plan views respectively showing an arrangement of an optical system adopting the knife-edge method according to another embodiment of the present invention, for optically recording, reproducing and erasing information.
Figure 6B:
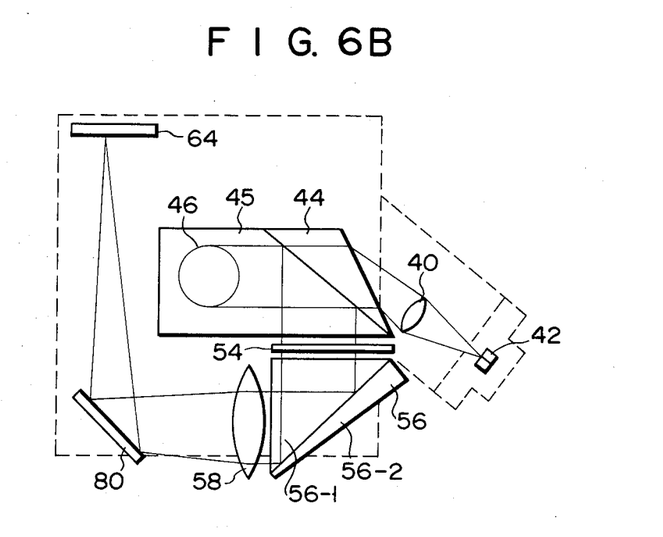

The present invention is not limited to the above embodiment but can be modified in various ways. For example, surface 56B need not be divided into three surfaces having different angles with respect to each other, but polarizing surface 56A can be divided into three surfaces 56A-1, 56A-2 and 56A-3 having different angles with respect to each other, and wedge prism 56 can be bonded thereto, as shown in FIG. 5. In addition, mirror 80 can be arranged between projection lens 58 and optical detector 64, as shown in FIGS. 6A and 6B, so that the laser beam is reflected and then introduced in detector 64. With the arrangement of mirror 80, a space within frame 82 can be used effectively.

Figure 7:
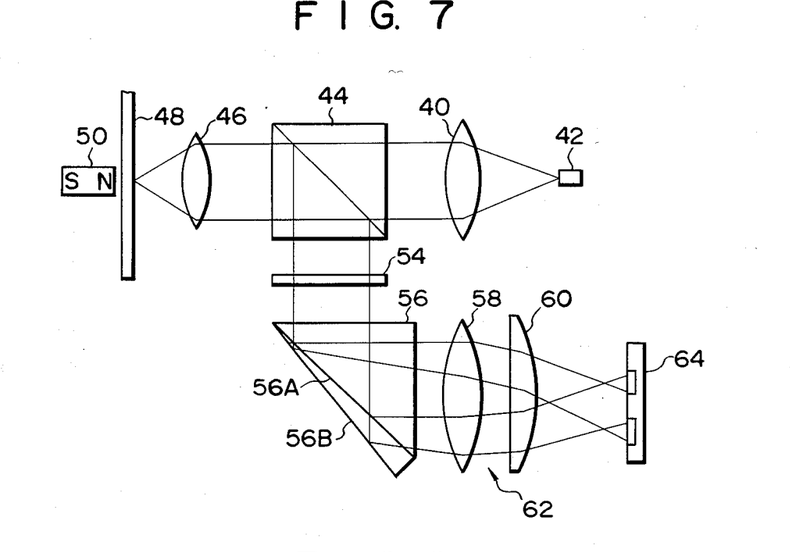
FIG. 7 is a side view showing an arrangement of an optical system adopting an astigmatism method according to another embodiment of the present invention, for optically recording, reproducing and erasing information.

FIG. 7 shows an optical system according to a modification of the present invention. In FIG. 7, the same reference numerals are used to indicate the same or equivalent portions in FIGS. 1 to 6, and a detailed description thereof is omitted. In FIG. 7, the astigmatism method is adopted in place of the knife-edge method as the focus detecting method. With the astigmatism method, cylindrical lens 60 is arranged between projection lens 58 and optical detector 64 having an optical detecting region shown in FIG. 8, polarizing beam splitter 56 is obtained by bonding a wedge prism to a rectangular prism, polarizing surface 56A or reflecting surface 56B of polarizing beam splitter 56 have not a plurality of surfaces unlike in FIG. 2, and surfaces 56A and 56B are formed into continuous and flat surfaces, respectively.

Therefore, when collimated laser beams including P and S components are incident on splitter 56, the S component is reflected by surface 56A, and the P component is transmitted through surface 56A to surface 56B, and is then reflected thereby. Surfaces 56B and 56A are not parallel to each other but constitute a small angle. The laser beams of the P and S components are thss directed in different directions. The laser beams of the P and S components emerging from splitter 56 are converged by astigmatism lens system 62 of convex lens 58 and cylindrical lens 60, at angles slightly different from each other, and are incident on detector 64. Therefore, when objective lens 46 is in the infocus state, the points of convergence of the laser beams of P and S components are formed on different regions of the light-receiving surface of detector 64.

Figure 8:
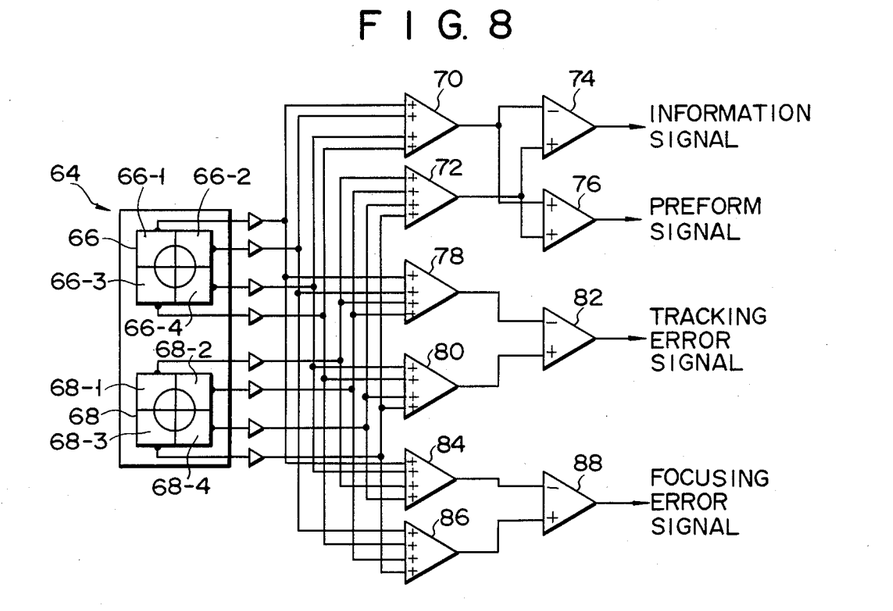
FIG. 8 is a plan view of an optical detector and its peripheral circuits shown in FIG. 7.

Optical detector 64 of this embodiment has first and second detecting sections 66 and 68, as shown in FIG. 8. Section 66 has four detecting regions 66-1, 66-2, 66-3 and 66-4, at a center on which the laser beam of the S component is converged when lens 46 is in the in-focus state. Section 68 has four detecting regions 68-1, 68-2, 68-3 and 68-4, at a center on which the the laser beam of the P component is converged when lens 46 is in the in-focus state. Signals from regions 66-1, 66-2, 66-3 and 66-4 of first detecting section 66 are added by first adder 70. Signals from regions 68-1, 68-2, 68-3 and 68-4 of second detecting section 68 are added by second adder 72. Addition outputs from first and second adders 70 and 72 are supplied to subtracter 74, which generates an information reproduction signal. More specifically, the difference of the S and P components, which changes in accordance with rotation of polarization plane of the laser beam, is generated by subtracter 74 as the information reproduction signal. The added outputs of first and second adders 70 and 72 are supplied to adder 76, which generates a reproduction component of a preform signal. In other words, the light intensity of the laser beam having an intensity modulated by a prepit is generated by adder 76 as the reproduction component of the preform signal. In addition, the signals from first and second regions 66-1 and 66-2 of first section 66, and from first and second regions 68-1 and 68-2 of second section 68 are added by third adder 78. The signals from third and fourth regions 66-3 and 66-4 of first section 66, and from third and fourth regions 68-3 and 68-4 of second section 68 are added by fourth adder 80. Addition signals from third and fourth adders 78 and 80 are supplied to subtracter 82, which generates a tracking error signal. The signal from first and third regions 66-1 and 66-3 of first section 66, and from first and third regions 68-1 and 68-3 of second section 68 are also added by fifth adder 84. The signals from second and fourth regions 66-2 and 66-4 of first section 66, and from second and fourth regions 68-2 and 68-4 of second section 68 are also added by sixth adder 86. Addition signals from fifth and sixth adders 84 and 86 are supplied to subtracter 88, and a focusing error signal is generated therefrom.

Lens 46 is shifted along its optical axis in accordance with the focusing error signal and is constantly maintained in the in-focus state. Lens 46 is also shifted in a direction perpendicular to its optical axis in accordance with the tracking error signal, so that the tracking guide is traced with a correctly focused laser beam. As a result, recorded information is read out from the optical disk, and the preform signal and recorded information are reproduced. Simultaneously, in the recording mode, information is written correctly, and in the erasure mode, recorded information is reliably erased.

An optical system of another embodiment of the present invention adopting the knife-edge method will be described with reference to FIGS. 9A to 9C. The same reference numerals in FIGS. 9A to 9C denote the same or equivalent portions in FIGS. 1 to 6, and a detailed description thereof will be omitted. In the optical system shown in FIG. 9A, wedge prism 56 is used as the polarizing beam splitter, and has polarizing surface 56A as one surface and light-reflecting surface 56B as the opposing surface. Modified lens 90 is used as a lens for projecting laser beams of S and P components onto detector 64. Lens 90 is formed by cutting a flat portion of a plano-convex lens such that it has surfaces 90B and 90C inclined with respect to flat surface 90A, as shown in FIG. 9B. One surface of lens 90 is divided by boundary 92-1 contacting inclined surfaces 90B and 90C, boundary 92-2 contacting flat surface 90A and inclined surface 90B, and boundary 92-3 contacting flat surface 90A and inclined surface 90C. Detector 64 has first, second and third detecting sections 94, 96 and 98. First section 94 has first and second light-detecting regions 94-1 and 94-2 separated along the direction of boundary 92-1. Third section 98 has first and second light-detecting regions 98-1 and 98-2 separated along the direction perpendicular to the direction of boundary 92-1, with a gap therebetween.

The laser beams of the P and S components emerging from polarizing beam splitter 56 are incident on lens 90 at slightly different angles and are converged thereby. Next, the laser beams of the S component emerge from surfaces 90B, 90C and flat surface 90A, and the laser beam of the P component emerges only from surface 90A. The converged laser beams of the P component emerging from surface 90A are directed toward first and second regions 96-1 and 96-2 of second section 96. The converged laser beams of the S component emerging from surfaces 90B, 90C and 90A are directed toward separated first and second regions 98-1 and 98-2 of third section 98. The converged laser beam of the S component merging from surface 90A is also directed to first section 94.

Subtracter 103 calculates a difference between the signals generated from separated first and second regions 98-1 and 98-2 of third section 98, and generates it as a tracking error signal. A focusing signal is generated as a difference between signals from first region 94-1 and second region 94-2 is obtained is generated from substracter 106. In addition, the signals from first and second regions 94-1 and 94-2 of first section 94, and from first and second regions 98-1 and 98-2 of second section 98 are added by an adder, and a difference between the addition result and a signal generated by third section 96 is obtained by subtracter 109, thereby reproducing information. The signals from first and second regions 94-1 and 94-2 of first section 94, second section 98 and third section 96 are also added by adder 110 to reproduce a preform signal.

Figure 9A:
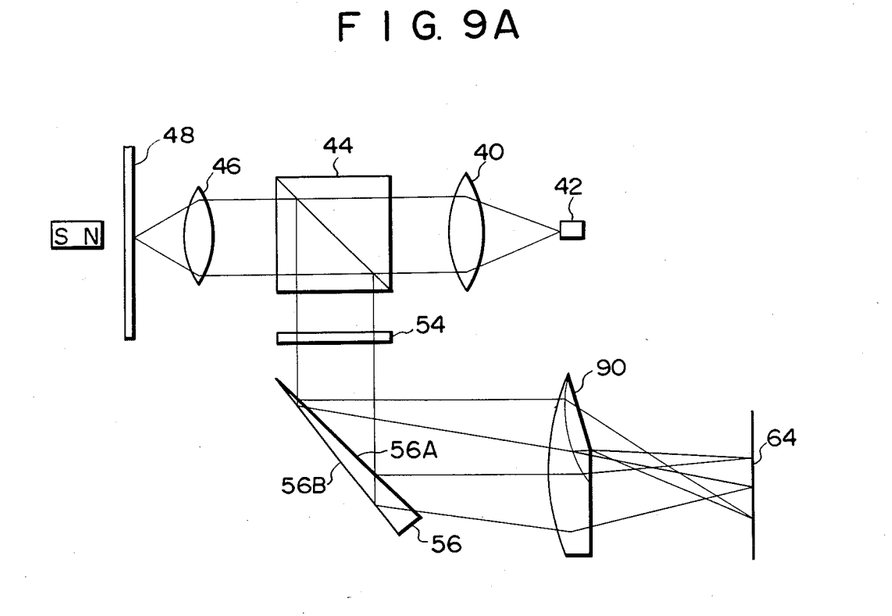
FIG. 9A is a side view showing an arrangement of an optical system adopting the knife-edge method according to still another embodiment of the present invention, for optically recording, reproducing and erasing information.
Figure 9B:
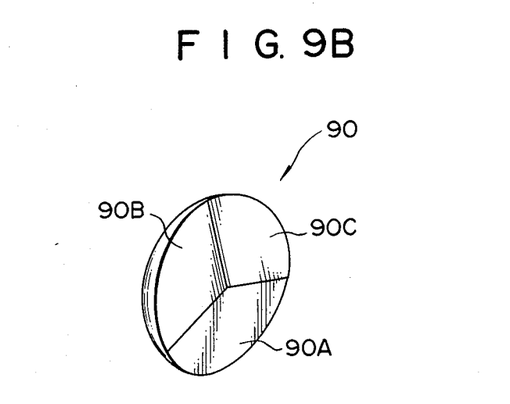
FIG. 9B is a perspective view of a projection lens shown in FIG. 9A.
Figure 9C:
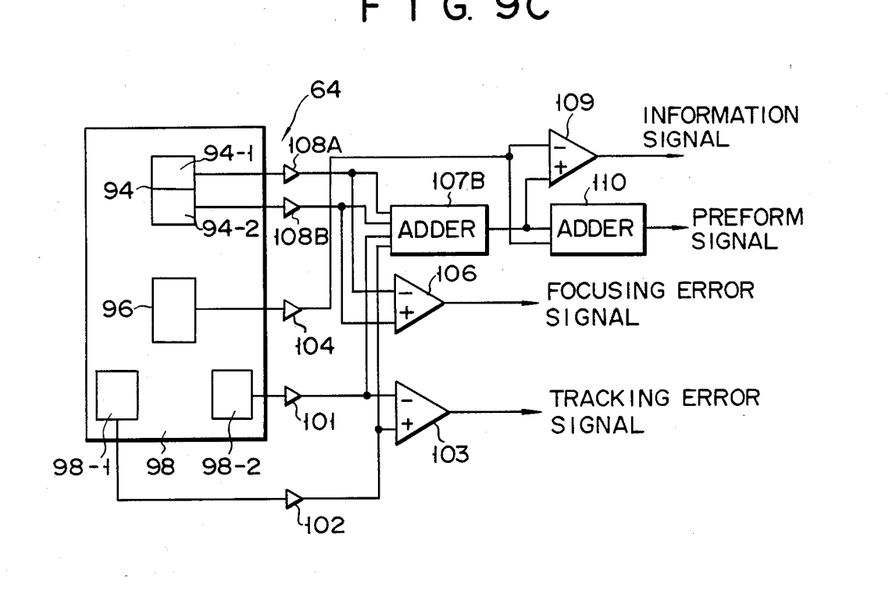
FIG. 9C is a plan view of an optical detector and its peripheral circuits shown in FIG. 9A.
Figure 10:
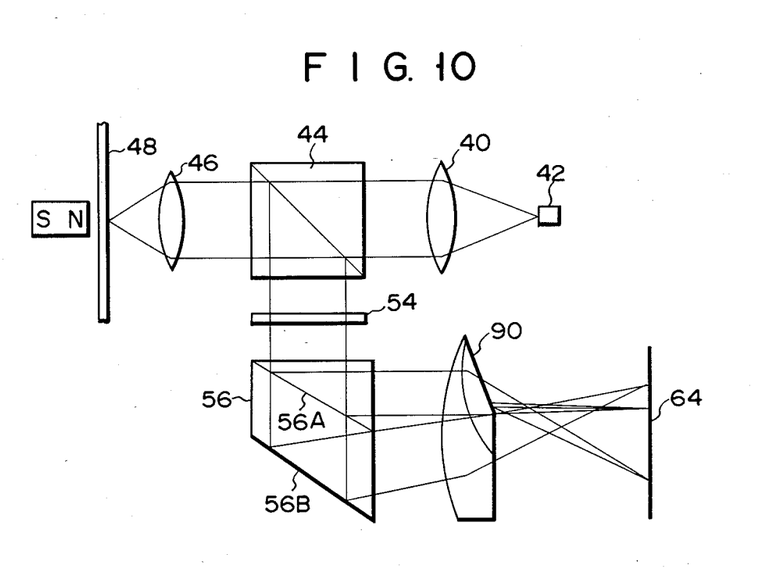
FIG. 10, is a side view showing an arrangement o an optical system adopting the knife-edge method according to another modification of the present invention, for optically recording, reproducing and erasing information.

The present invention is not limited to the polarizing beam splitter shown in FIGS. 7 and 9A, but can use a polarizing beam splitter shown in FIG. 10. More specifically, polarizing beam splitter 56 shown in FIG. 10 can be obtained by bonding a rhombic prism to a rectangular prism, a bonding surface therebetween can constitute polarizing surface 56A, and a surface of the rhombic prism opposite the bonding surface can constitute reflecting surface 56B.

The above embodiment exemplifies an optical system for recording, reproducing and erasing information on a magneto-optical disk. However, the present invention can also be applied to an optical system for recording and reproducing information on and from an unerasable optical disk for recording information in the form of a pit. Such an optical system will be described with reference to FIG. 11. The same reference numerals in FIG. 11 denote the same or equivalent portions in FIGS. 1 to 10, and a detailed description thereof will be omitted. In the optical system of FIG. 11, ¼ plate 154 is arranged between polarizing beam splitter 44 and objective lens 46, and reflecting mirror 156 is arranged between splitter 44 and projecting lens 58.

Figure 11:
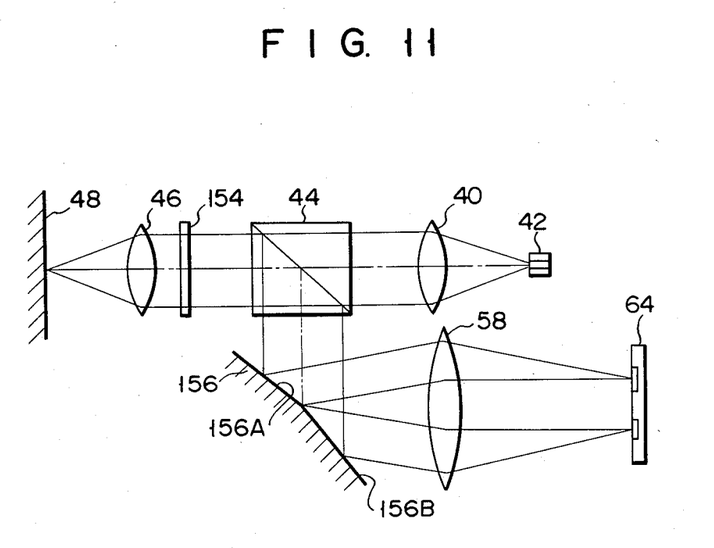
FIG. 11 is a side view showing an arrangement of an optical system adopting the knife-edge method according to still another modified embodiment of the present invention, for optically recording, reproducing and erasing information.

In this optical system, information is written as a pit on optical disk 48 by a laser beam converged by lens 46 in the in-focus state, and information is read out from a written pit with a laser beam. More specifically, in the write mode, a pit is formed in a track on a recording layer of disk 48 by laser beam L of a modulated light intensity. In the read mode, a laser beam of a predetermined light intensity is modulated by the pit formed in the track of the recording layer, and is reflected thereby.

Divergent laser beam L reflected by the recording layer of disk 48 is converted into collimated beams by lens 46 in the in-focus state, transmitted through plate 154, and returned to splitter 44. Since laser beam L passes plate 154 twice, its plane of polarization is rotated through 90 degrees from the beam which is transmitted through splitter 44. Laser beam L with the plane of polarization rotated through 90 degrees is not transmitted through splitter 44, but is reflected thereby and guided to mirror 156.

Figure 12:
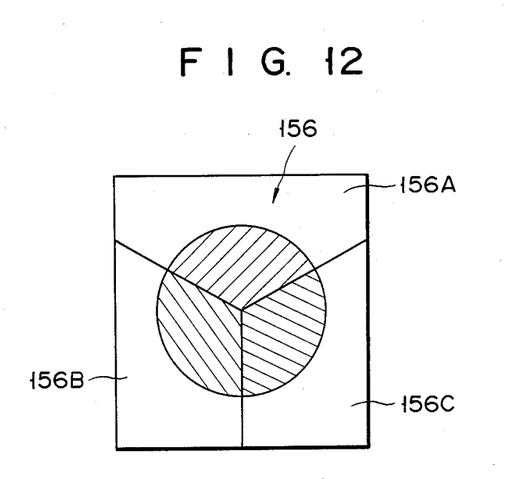
FIG. 12 is a plan view of a reflecting mirror shown in FIG. 11.

Mirror 156 has three adjacent light-reflecting surfaces with predetermined inclinations in respect to each other, as shown in FIG. 12. More specifically, mirror 156 has one focusing error detection light-reflecting surface 156A and two tracking error detection light-reflecting surfaces 156B and 156C. Assume that the intersection of ridges of three surfaces 156A, 156B and 156C coincides with the optical axis extending from splitter 44, and an image of a track is formed on a boundary tangent between surfaces 156B and 156C. Surfaces 156A, 156B and 156C are arranged such that they are substantially parallel to the extending direction of the track, an incident laser beam is split into a focusing error detecting laser beam component and a tracking error detecting laser beam component, which propagate in different directions, and are projected onto single detector 64 through single focusing lens 58.

Figure 13:
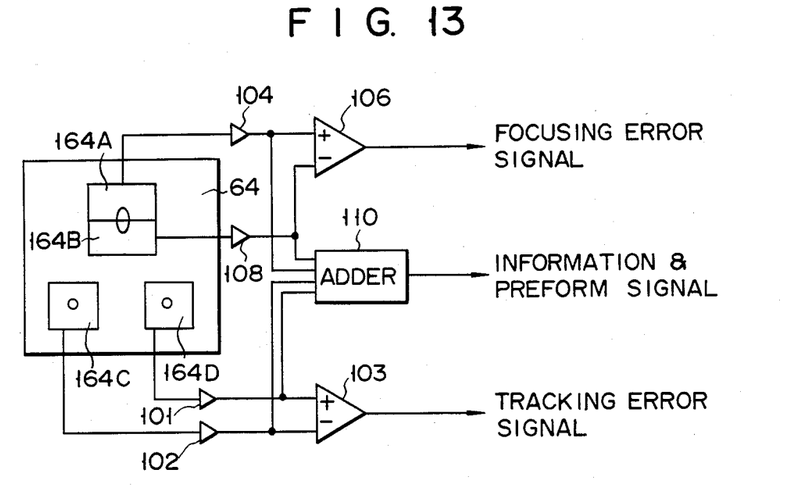
FIG. 13 is a plan view of an optical detector and its peripheral circuits shown in FIG. 11.

Detector 64 is arranged at a converging point of the laser beam components focused by lens 58 and comprises a pair of adjacent light-detecting regions 164A and 164B for detecting a focus error signal, and a pair of light-detecting regions 164C and 164D for detecting a tracking error signal, with a gap therebetween, as shown in FIG. 13. The laser beam component reflected by surface 156A is focused at a midpoint between regions 164A and 164B in the in-focus state, and irradiates either region 164A or 164B in an out-of-focus state. Thus, a difference between outputs from regions 164A and 164B is produced as a focusing error signal from subtracter 106. In other words, an out-of-focus state is detected by the knife-edge method. The laser beam components reflected by surfaces 156B and 156C are focused on regions 164C and 164D, respectively. The beam spot of laser beam L returned from a track on disk 48 by reflection thereby constitutes a far field pattern, reflecting disk 48 on detector 64, and forms an asymmetrical intensity distribution if there is a tracking error. Therefore, when a change in ratio in the amount of light from the laser beam component reflected by surface 156B to that reflected by surface 156C is detected, i.e., a difference between detected signal amounts is obtained, a tracking error is detected by, e.g., the push-pull method. Note that an information signal and a preform signal are obtained by amplifying the signals from regions 164A, 164B, 164C and 164D with amplifiers 101, 102, 104, 105, 108A and 108B, and by processing with adders 107A and 107B and subtracter 109.

In the above arrangement, the laser beam is split into a focusing error detecting laser beam component and a tracking error detecting laser beam by mirror 156 having three adjacent light-reflecting surfaces inclined at predetermined angles with respect to each other, i.e., one focusing error detection surface 156A and two tracking error detection surfaces 156B and 156C. Therefore, focusing and tracking errors can be detected by single detector 64 without using a half prism or the like for splitting laser beam L. In addition, three laser beam components can be focused by single focusing lens 58. Therefore, the number of optical components and the price of the product are reduced, the size of the overall product is considerably reduced, and assembly and adjustment thereof become easy.

Figure 14:
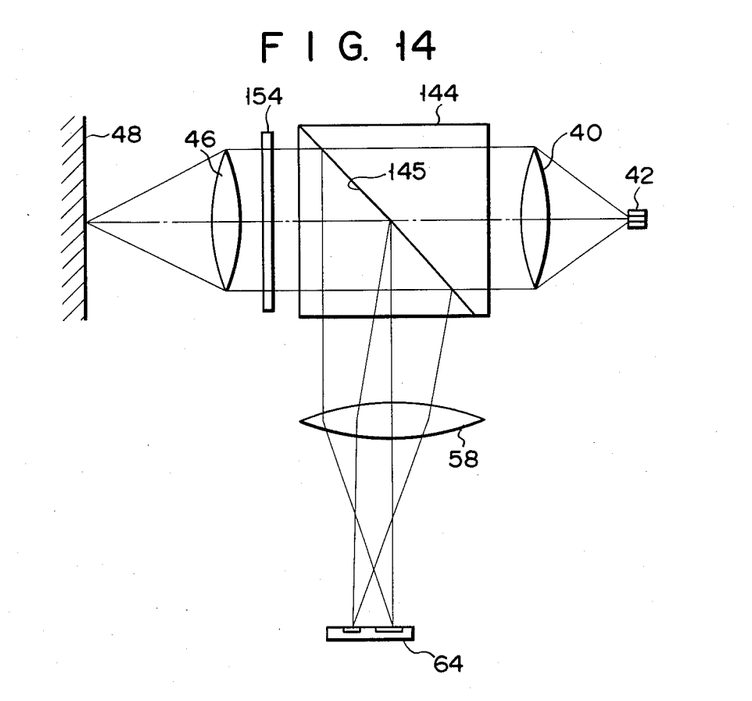
FIG. 14 is a side view of an arrangement of an optical system adopting the knife-edge method according to still another modification of the present invention, for optically recording, reproducing and erasing information.

As is apparent from FIG. 14, mirror 156 of the optical system of FIG. 11 can be removed, and polarizing beam splitter 44 of FIG. 11 can be replaced by polarizing beam splitter 144, wherein polarizing surface 145 is divided into three surface regions, as shown in FIG. 12, and two surface regions are inclined in different directions with respect to the remaining surface region. In the optical system of FIG. 14, the laser beam travelling toward disk 48 is transmitted through polarizing surface 145 of splitter 144 and focused by lens 46 on disk 48. In contrast to this, the laser beam from disk 48 is reflected by surface 145 to be split by the three surface regions, into three laser beams, which are then directed in different directions. The laser beams are then focused by lens 58, and are incident on detector 64 having detecting regions as shown in FIG. 13. Therefore, a focusing error signal, a tracking error signal, an information signal and a preform signal can be obtained from detector 64.

Figure 15:
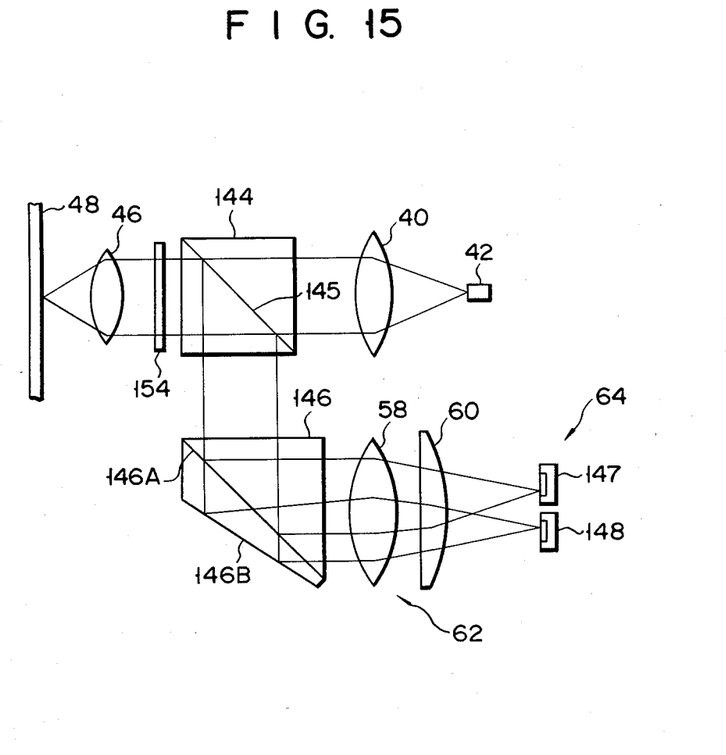
FIG. 15 is a side view showing an arrangement of an optical system according to a modification of the embodiment shown in FIG. 7.

FIG. 15 shows an optical system according to a another modification of the present invention. The optical arrangement shown in FIG. 15 is similar to that shown in FIG. 7, in which the astigmatism method for detecting a focus is applied. However, in the optical arrangement shown in FIG. 15, a polarizing beam splitter 145 is located between an objective lens 46 and a collimator lens 40, instead of the beam splitter 44 of half mirror type shown in FIG. 7 and a λ/4 plate 154 is located between the polarizing beam splitter 145 and the objective lens 46. Furthermore, a prism or beam spritter 146 having a half mirror surface 146A and a reflecting surface 146B are arranged in a beam path between the beam spritter 145 and the astigmatism lens system 62, instead of the polarizing beam splitter 56 shown in laser beam reflected from the optical disk 48 is directed to the prism 146 by the polarizing splitter 144. The reflected laser beam is reflected by the half mirror surface 146A and the reflective surface 146B in the prism so that two laser beams having a substantially same intensity level are emerged from the prism 146 and are converged by the astigmatism lens system 62 onto photo detectors 147, 148, respectively. Accordingly, information signal, preform signal, tracking error signal and focusing error signal are obtained from output signals generated by the photo detectors 147, 148, by a circuit having a same circuit arrangement as that of FIG. 8.

In the above embodiment, the laser beam reflected by the optical disk is optically processed. However, it is apparent that the laser beam transmitted through the optical disk can be processed by the above optical system. The reflection and transmission of the laser beam described in this specification can be generally referred to as transfer of the laser beam.

As described above, according to the present invention, signals to be converted into a focusing error signal, a tracking error signal, a preform signal or recorded information can be obtained by a single optical detector of an optical system in an optical head. In addition, since the laser beam reflected by the optical disk is directed to the optical detector, the optical detector can be made compact, resulting in a compact device. Since the travel path of the laser beam is not divided into a plurality of paths, the number of components can be reduced, and the device can be manufactured at low cost. Furthermore, since collimated laser beams are incident on the polarizing beam splitter of the optical system of the present invention, the beams are incident on the polarizing surface at identical angles. As a result, the separation ratio of the P and S components can be maintained constant.

What is claimed is:

1. An optical system for use with an optical memory comprising:
   means for directing a light beam onto a surface of said optical memory;
   means for separating light reflected from said surface of said optical memory into a plurality of resultant light beams, said separating means including a plurality of light reflecting surface portions each arranged at a different angle relative to said optical memory to cause each of said resultant light beams to converge onto a single plane; and
   means for detecting said resultant light beams as said resultant light beams converge upon said plane.

2. An optical system of claim 1, wherein said separating means includes at least three of said plurality of light reflecting surface portions disposed contiguous to one another.

3. An optical system of claim 1, wherein said detecting means has different detecting regions and wherein said separating means causes each of said resultant light beams to be directed onto said plane at the different detecting regions of said means.

4. An optical system of claim 3, wherein said separating means includes a lens through which all of said resultant light beams pass.

5. An optical system for use with an optical memory comprising:
   means for directing a light beam onto said optical memory;
   means for separating resultant light received from said optical memory into first and second resultant polarized light beams, said means for separating comprising a first surface for reflecting said first resultant polarized light beam in a first direction and for transmitting said second resultant polarized light beam therethrough, and a second surface, not parallel to said first surface, for reflecting said second resultant polarized light beam in a second direction different from said first direction; and
   means for detecting said first and second resultant light beams.

6. An optical system of claim 5, wherein said first surface is a polarized beam splitter surface.

7. An optical system of claim 5, wherein said separating means sequentially causes said second resultant polarized light beam to pass through said first surface, to be reflected and returned to said first surface by said second surface, and to pass through said first surface.

8. An optical system of claim 5, wherein said second surface of said separating means includes a plurality of contiguous light reflecting surfaces, each inclined at a different angle relative to said optical memory, to split said second resultant polarized light beam into a plurality of secondary resultant light beams.

9. An optical system of claim 5, wherein said detecting means comprises a plurality of photosensitive regions formed on a surface of a photodetector unit.

10. An optical system of claim 8, wherein said plurality of contiguous light reflecting surfaces comprises at least three light reflecting surfaces.

11. An optical system of claim 10, wherein said detecting means comprises a plurality of photosensitive regions formed on a surface of a single photodetector unit, and wherein said system further includes means for converging said first and second resultant polarized light beams, including said secondary resultant light beams derived therefrom, onto said plurality of photosensitive regions.

12. An optical system of claim 5, further comprising means for converging said first and second resultant light beams onto said detecting means.

13. An optical system of claim 12, wherein said converging means includes a lens system for converging said first and second resultant polarized light beams onto said detecting means.

14. An optical system of claim 5, wherein said first and second surfaces for reflecting said first and second resultant polarized light beams are arranged to dirict said second resultant polarized light beam, upon reflection from said second surface, back through said first surface.

15. An optical system for use with an optical memory having a surface with a plurality of tracks defining a tracked surface, comprising:
   means for directing a light beam onto said tracked surface;
   a photodetector unit having a surface upon which a plurality of photosensitive regions are located;
   means for separating light reflected from said tracked surface into first and second polarized components and for separating one of said first and second polarized components from the other,
   said separating means comprising a first surface portion for reflecting said first component in a first direction and for transmitting said second component therethrough, and a second surface portion for reflecting said second component is a second direction,
   said separating means further comprising third, fourth and fifth secondary surfaces for separating one of said first and second components into third, fourth and fifth secondary components oriented in third, fourth and fifth directions, respectively,
   said third, fourth and fifth directions and said direction of said other of said first and second components being disposed obliquely relative to each other and each converging on at least one of said regions of said photodetector unit; and
   means, coupled to said photodetector unit, for sensing data stored in said tracked surface as a function of the combined value of said third, fourth and fifth components in comparison to the value of said other of said first and second components, and for orienting said directing means to focus and align said light beam on said tracked surface as a function of said third, fourth and fifth components.

16. An optical system of claim 15, wherein said second surface comprises said third, fourth and fifth surfaces.

17. An optical system of claim 16, wherein said third, fourth and fifth surfaces are contiguous to one another.

18. An optical system of claim 15, wherein said first surface is a half mirror surface.

19. An optical system for an optical memory, said optical memory being capable of storing and retrieving information by light exposure, comprising:
  means for generating a light beam;
  means for directing the light beam generated by said generating means toward a surface of said optical memory along a first optical path;
  first means for converging the light beam directed by said directing means onto said optical memory and for returning light reflected by said optical memory along the first optical path;
  means for redirecting the light beam returned by said converging means along a second optical path different from the first optical path;
  means for separating the light beam redirected from said redirecting means into a plurality of resultant light beams, said separating means being provided with a plurality of light-reflecting surfaces for producing the plurality of resultant light beams and for directing the resultant light beams in different directions;
  second means for converging the plurality of resultant light beams onto a common plane; and
  means for detecting the resultant lgith beams converged onto said plane by said second converging means.

* * * * *

UNITED STATES PATENT AND TRADEMARK OFFICE
CERTIFICATE OF CORRECTION

PATENT NO. :
DATED : 4,797,868
January 10, 1989
INVENTOR(S) : Hideo Ando

It is certified that error appears in the above-identified patent and that said Letters Patent is hereby corrected as shown below:

Claim 14, Column 12, Line 30, change "dirict" to --direct--.

Claim 19, Column 14, Line 16, change "lgith" to --light--.

Signed and Sealed this

Third Day of July, 1990

Attest:

HARRY F. MANBECK, JR.

Attesting Officer

Commissioner of Patents and Trademarks